United States Patent
De Barros et al.

(10) Patent No.: US 6,985,654 B2
(45) Date of Patent: Jan. 10, 2006

(54) DEVICE AND A METHOD FOR TRANSFORMING SIGNAL PROPAGATION MODE BY INTERFERENCE

(75) Inventors: Carlos De Barros, Boulogne-Billancourt (FR); Isabelle Riant, Orsay (FR)

(73) Assignee: Alcatel, Paris (FR)

(*) Notice: Subject to any disclaimer, the term of this patent is extended or adjusted under 35 U.S.C. 154(b) by 2 days.

(21) Appl. No.: 10/829,180

(22) Filed: Apr. 22, 2004

(65) Prior Publication Data

US 2004/0213513 A1    Oct. 28, 2004

(30) Foreign Application Priority Data

Apr. 25, 2003  (FR) ................... 03 05095

(51) Int. Cl.
  *G02B 6/26* (2006.01)
  *G02B 6/14* (2006.01)
(52) U.S. Cl. ................ 385/28; 385/27; 385/37; 385/43
(58) Field of Classification Search .......... 385/27, 385/28, 29, 37, 43, 50
See application file for complete search history.

(56) References Cited

U.S. PATENT DOCUMENTS

| | | | |
|---|---|---|---|
| 6,269,205 B1 | 7/2001 | Peral |
| 6,377,726 B1 | 4/2002 | Braude |
| 6,418,256 B1 | 7/2002 | Rosenblit |
| 2002/0012498 A1 | 1/2002 | Danziger |

FOREIGN PATENT DOCUMENTS

EP         0 262 911 A      6/1988

*Primary Examiner*—Rodney Bovernick
*Assistant Examiner*—Omar Rojas
(74) *Attorney, Agent, or Firm*—Sughrue Mion, PLLC

(57) ABSTRACT

An optical device (D) is dedicated to transforming the propagation mode of optical signals. The device comprises mode transformation means (3–5) associated with a multi-mode fiber (2) and comprising first and second mode converters (3 and 5) coupled to each other by a multimode fiber portion (4) of selected length (L). The first converter (3) is fed with signals propagating in a first mode and it delivers the signals to the fiber portion (4) in part in the first mode and in part in a second mode of order higher than the first, and the second converter (5) is arranged to cause the signals in the first and second modes to interfere so that on outlet therefrom they present a selected spectral spacing.

11 Claims, 1 Drawing Sheet

DEVICE AND A METHOD FOR TRANSFORMING SIGNAL PROPAGATION MODE BY INTERFERENCE

BACKGROUND OF THE INVENTION

The invention relates to the field of optical transmission, and more particularly to transforming propagation mode in optical transmission systems.

As is known to the person skilled in the art, certain waveguide structures, such as optical fibers, enable optical signals to be transmitted either in a propagation mode known as the "fundamental" mode or else in a propagation mode known as a "high order" mode.

Propagation in a high order mode can make it possible, in particular, to improve the overall performance of the optical transmission system. By specially arranging certain waveguide structures, it is possible to give them certain properties, such as, for example, high negative dispersion and high effective area, thereby making it possible in particular to integrate them in modules for compensating chromatic dispersion. This applies in particular to multimode or weakly multimode fibers that are also referred to as high order mode (HOM) fibers.

The design and fabrication of this type of optical fiber are now well understood. Unfortunately, the longitudinal mode conversion techniques which are normally used for generating the higher modes fed to HOM optical fibers do not enable 100% of the power in a low order mode to be converted into a selected high order mode. Amongst these various techniques, mention can be made in particular of long period gratings (LPGs) as described in particular in an article by S. Ramanchandran et al., published in Electronics Letters, Vol. 37, No. 22, October 2001, and optical fibers that include an internal hollow, known as "tapered hollow fibers", as described in particular in an article by the Kist Institute entitled "Tapered hollow fiber for mode conversion", CLEO'01 paper CtuAA2.

As a result of the above-mentioned drawback, low order modes coexist with high order modes within HOM optical fibers. These various modes can then interfere by means of a mechanism known as multipath interference (MPI) thus significantly reducing the quality of the transmitted signals, thereby limiting potential applications for such optical fibers. In order to ensure that this reduction is not unacceptably harmful, it is necessary for the ratio between the energy conveyed by the undesirable lower order mode to the energy conveyed by the high order mode at a given wavelength should be less than 40 decibels (dB).

To achieve such a ratio, it is necessary to interpose a dedicated conversion fiber between the single mode fiber (SMF) which delivers the low order mode and the HOM fiber. Unfortunately, this intermediate fiber must firstly enable propagation of a low order mode that corresponds exactly to the low order mode of the single mode fiber feeding it, must secondly provide a high order mode that corresponds exactly to the high order mode of the HOM optical fiber it feeds, and must thirdly either enable low order and high order modes to overlap in an energy coupling region of small extent, or else present substantially zero difference between group indices between the low order and high order modes. Such characteristics are particularly difficult to obtain.

In an attempt to improve the situation, PCT patent document WO 99/49342 proposes a transverse spatial mode converter. The idea is to shape the phase and/or amplitude of the low order mode in the so-called "far field" space by placing a phase plate in the Fourier plane of a lens. Unfortunately, the transformed mode must accurately overlap the high order mode of the HOM fiber while presenting substantially zero overlap with all other modes, which is particularly difficult to achieve.

BRIEF SUMMARY OF THE INVENTION

The invention thus seeks to improve the situation.

To this end, the invention provides an optical device for transforming the propagation mode of optical signals, the device comprising transformation means associated with a multimode or weakly multimode fiber (or HOM fiber).

The transformation device is characterized by the fact that its mode transformation means comprise first and second mode converters coupled to each other by a portion of HOM fiber of selected length, the first converter being fed with signals propagating in a first mode (the LP01 fundamental mode) and delivering signals into the HOM fiber portion, in part in the first mode and in part in a second mode of order higher than the first (e.g. the LP02 mode), with the second converter serving to cause the signals propagating in the first and second modes to interfere so that, on outlet, they present a selected spectral spacing.

The transformation means thus act as a Mach-Zenhder type interferometer constraining the first and second modes to follow different optical paths so as to compensate for their different group velocities, prior to recombining them in amplitude and in phase.

Advantageously, the length of the HOM fiber portion is selected as a function of the first and second modes and as a function of the selected spectral spacing.

Preferably, the first converter is a 3 dB type mode converter capable of converting about 50% of the power of the signals feeding it and propagating in the first mode into signals propagating in the second mode. Similarly, the second converter is preferably a mode converter of the 3 dB type.

In a particularly advantageous embodiment, the device of the invention is implemented in the form of a HOM fiber having the mode transformation means defined therein together with the portion of fiber of selected length.

For example, the first and/or second converters may be implemented in the form of long periodic gratings (LPGs), a non-adiabatic waveguide with progressive decrease and/or increase, a multimode coupler, or any other device enabling energy to be converted from one mode to another mode.

By way of example, such a device may constitute a chromatic dispersion compensating fiber (DCF).

The invention also provides a method of transforming the propagation mode of optical signals, the method consisting in feeding a first mode converter with signals propagating in a first mode, so as to deliver the signals into a portion of HOM fiber of selected length, in part in the first mode and in part in a second mode of order higher than the first, then in allowing the signals in the first and second modes to propagate in the portion of HOM fiber, and in causing the signals to interfere by means of a second converter coupled to the portion of fiber, so that on outlet the signals present a selected spectral spacing.

Such an invention is particularly well adapted, although in non-limiting manner, to interlacing or multiplexing modes, to filtering modes, and to changing mode in-line.

BRIEF DESCRIPTION OF THE SEVERAL VIEWS OF THE DRAWINGS

Other characteristics and advantages of the invention will appear on examining the following detailed description, and the accompanying drawings, in which.

DETAILED DESCRIPTION OF THE INVENTION

The accompanying drawings may serve not only to complement the description of the invention, but may also contribute to defining the invention, where appropriate.

The invention seeks to enable propagation mode to be transformed in optical transmission systems. The description below relates to a device of the invention which constitutes a chromatic dispersion compensating fiber module implanted in an optical fiber transmission line.

Figure 1:
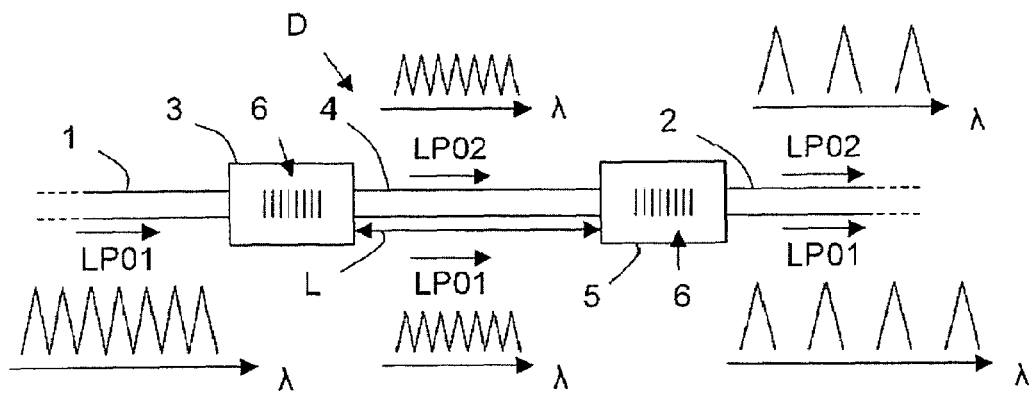
FIG. 1 is a diagram of an embodiment of a mode transformation device of the invention.

The transmission line shown in FIG. 1 comprises an upstream optical fiber 1 connected to a downstream optical fiber 2 via a mode transformation device D of the invention.

By way of example, the upstream optical fiber 1 is a single mode fiber in which there propagate signals that are placed in a fundamental LP01 mode and that present a power level P, while the downstream optical fiber 2 is, for example, a multimode or weakly multimode (or HOM) optical fiber in which there propagate at least some signals in a higher order mode LP0m (e.g. m=2) obtained by the conversion performed by the device D on the LP01 signals.

In the invention, the transformation device D comprises a first mode converter 3, preferably of the 3 dB type, serving to convert about 50% (i.e. P/2) of the power P of the LP01 mode signals as delivered by the upstream optical fiber 1 into signals propagating in the selected LP02 mode, while passing the remaining 50% (i.e. P/2) of the initial power P in LP01 mode.

This first converter 3 feeds the inlet of a portion 4 of multimode or weakly multimode (also known as HOM) optical fiber of selected length L with signals in LP01 mode and of power P/2 and with signals in LP02 mode and of power P/2.

The signals in LP01 mode and the signals in LP02 mode propagate in the HOM fiber portion 4 to its outlet which is coupled to a second converter 5 likewise comprising a transformation device D. The second converter 5 is preferably of the 3 dB type. It serves to couple (or recombine) the LP01 mode signals and the LP02 mode signals as delivered by the HOM fiber portion 4 so that they interfere with each other.

Figure 2:
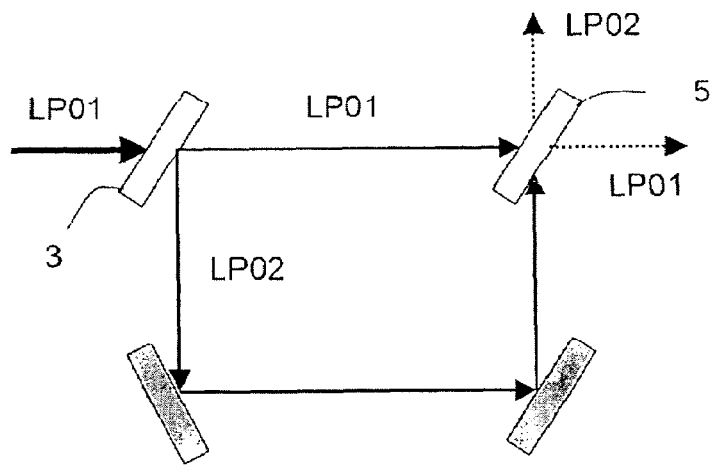
FIG. 2 is a diagram showing the action of the HOM fiber portion and the two mode converters on a fundamental mode and on a high order mode.

The first converter 3, the HOM fiber portion 4, and the second converter 5 together constitute mode transformation means which behave, as shown in FIG. 2, like a Mach-Zenhder type interferometer. More precisely, the LP01 and LP02 modes present different group velocities on outlet from the first converter 3, so they have to follow different optical paths in the HOM fiber portion 4 in order to be able to recombined in amplitude and in phase at the second converter 5. Since LP01 mode presents the slower group velocity, it follows the shorter optical path in this case.

On outlet from the second converter 5, a substantially sinusoidal distribution of the initial power P is obtained as a function of the wavelength of the optical signals. More precisely, the respective powers $P_{LP01}(\lambda)$ and $P_{LP02}(\lambda)$ of the signals in LP01 mode and of the signals in LP02 mode are given by the following equations:

$$P_{LP01}(\lambda) = P * \cos^2\left(\Delta\beta * \frac{L}{2}\right)$$

$$P_{LP02}(\lambda) = P * \sin^2\left(\Delta\beta * \frac{L}{2}\right)$$

where:

$$\Delta\beta = \frac{2\pi}{\lambda}(n_{eff}^{core} - n_{eff}^{m}) - 2\pi * \frac{d}{d\lambda}(n_{eff}^{core} - n_{eff}^{m})$$

$n_{eff}^{core}$ is the effective refractive index of the lower order mode propagating in the HOM fiber portion 4, and $n_{eff}^{m}$ is the effective refractive index for mode m in the HOM fiber portion 4 (in this case m=2).

The length L of the HOM fiber portion 4 is thus selected as a function of the group velocities of the LP01 and LP02 modes and of the spectral spacing $\Delta\lambda$ desired between the modes LP01 and LP02, which corresponds to the periodicity of mode conversion, itself characterized by the inter-fringe distance EF of the interference pattern at the outlet of the second converter 5.

This inter-fringe distance EF is defined by the following equation:

$$EF \approx \frac{\lambda^2}{\left[L * \left[(n_{eff}^{core} - n_{eff}^{m}) - \lambda * \frac{d}{d\lambda}(n_{eff}^{core} - n_{eff}^{m})\right]\right]}$$

As mentioned above, the first and second converters 3 and 5 are preferably selected to be of the 3 dB type since that makes it possible to observe 100% of the fringes of the interference pattern.

For example, to obtain a spectral spacing $\Delta\lambda$ of about 50 gigahertz (GHz) with an effective refractive index difference $(n_{eff}^{core} - n_{eff}^{m})$ of about 0.02, the length L of the HOM fiber portion 3 needs to be equal to about 30 centimeters (cm).

3 dB type mode conversion can be obtained by any means known to the person skilled in the art. For example, as shown diagrammatically in FIG. 2, it is possible to use long period gratings 6 of the same type as those described in the article by S. Ramanchandran et al., in Electronics Letters, Vol. 37, No. 22, October 2001. However, it is equally possible to use tapered hollow fibers of the type described in the above-mentioned article by the Kist Institute entitled "Tapered hollow fiber for mode conversion", CLEO '01 paper CtuAA2.

These types of 3 dB converter are particularly advantageous since they can be implemented directly in a multimode or weakly multimode (or HOM) optical fiber.

With a long period grating, coupling is made possible by periodically modifying refractive index by means of ultraviolet (UV) irradiation. This makes it possible to couple the desired mode in copropagation. The period of this index variation then fixes the wavelength at which coupling takes place between the two modes (for LPGs in HOM type fibers the period is about 80 microns (μm)).

By using converters of these types, it is possible to implant a mode transformation device D of the invention directly in a HOM type fiber. Then all that remains is to couple one end of the single mode fiber 1 of a transmission line to one end of the HOM fiber including its device D, in order to implement the selected mode transformation function.

Amongst the various transformation functions that a device D of the invention can implement, mention can be made in particular of mode interlacing or mode multiplexing (at least two modes may be multiplexed in order to carry two adjacent channels), or mode filtering, or indeed in-line mode changing (a plurality of devices can be connected in series in a transmission line in order to enable transmission of a selected channel to alternate between a low order mode (e.g. LP01) and a high order mode (LP02)).

The invention is particularly well adapted, although not exclusively, to transmission over short distances.

Figure 3:
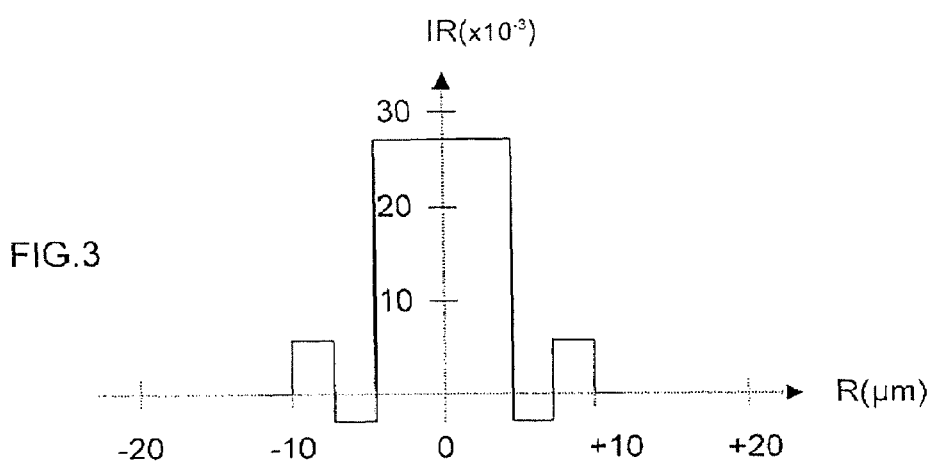
FIG. 3 is a diagram showing the refractive index (IR) of a particular HOM type optical fiber as a function of its radius (R).

By way of illustrative example, and using first and second converters 3 and 5 arranged in the form of long period gratings 6 each presenting firstly a period of 88 μm, secondly a length of 2.2 millimeters (mm), thirdly index modulation of $1.2 \times 10^{-3}$, and fourthly contrast of 3 dB, it is possible to obtain for a length L of HOM fiber portion 4 (having a refractive index profile of the type shown in FIG. 3 by way of non-limiting example) that is equal to about 30 cm, firstly spectral spacing Δλ of about 0.4 nanometers (nm), and secondly mode rejection of about 30 dB over a bandwidth of about 30 nm.

The invention also provides a method of transforming the propagation mode of optical signals.

The method can be implemented in particular by means of the above-described transformation device D. The main and optional functions and sub-functions performed by the steps of the method are substantially identical to those performed by the various means constituting the mode transformation device D, so the description below merely summarizes the steps that implement the main functions of the method of the invention.

The method consists in feeding a first mode converter 3 with signals propagating in a first mode so as to deliver the signals to a selected length L of multimode or weakly multimode (or HOM) fiber portion 4 partly in the first mode and partly in a second mode of order higher than the first, then in allowing the signals to propagate in the first and second modes in the HOM fiber portion 4, and then in causing the signals to interfere with the help of a second converter 5 coupled to the fiber portion 4 so that at the outlet thereof they present a selected spectral spacing Δλ.

The invention is not limited to the embodiments of the transformation device and the implementations of the transformation method described above, purely by way of example, but it covers any variant that the person skilled in the art might envisage in the ambit of the following claims.

What is claimed is:

1. An optical device (D) for transforming the propagation mode of optical signals, the device comprising mode transformation means (3–5) associated with a multimode fiber (2), in which said mode transformation means (3–5) comprise first and second mode converters (3 and 5) coupled to each other by a multimode fiber portion (4) of selected length (L), said first converter (3) being fed with signals propagating in a first mode and delivering said signals to said fiber portion (4) in part in said first mode and in part in a second mode of order higher than the first, and said second converter (5) being arranged to cause the signals in said first and second modes to interfere so that, on outlet therefrom, they present a selected spectral spacing (Δλ).

2. A device according to claim 1, in which the length (L) of said multimode fiber portion (4) is selected as a function of said first and second modes and of said selected spectral spacing (Δλ).

3. A device according to claim 1, in which said first mode is the fundamental propagation mode.

4. A device according to claim 1, in which said first converter (3) is a 3 dB type mode converter arranged to convert about 50% of the power of the signals fed thereto and propagating in the first mode into signals propagating in the second mode.

5. A device according to claim 1, in which said second converter (5) is a 3 dB type mode converter.

6. A device according to claim 1, implemented in the form of a multimode fiber in which said first and second mode converters (3 and 5) are implemented together with said fiber portion (4) of selected length (L).

7. A device according to claim 1, in which said first and second mode converters (3 and 5) are selected from a group comprising long period gratings, non-adiabatic waveguides with progressive decrease and/or increase, and multimode couplers.

8. A device according to claim 1, characterized in that it constitutes a chromatic dispersion compensating element.

9. A device (D) according to claim 1, used in a field selected from a group comprising: interlacing or multiplexing modes; filtering modes; and changing modes in-line.

10. A method of transforming the propagation mode of optical signals, the method consisting in feeding a first mode converter (3) with signals propagating in a first mode so as to deliver said signals to a multimode fiber portion (4) of selected length (L) in part in said first mode and in part in a second mode of higher order, then in allowing the signals in said first and second modes to propagate in said fiber portion (4), and then in causing said signals to interfere by means of a second converter (5) coupled to said fiber portion (4) in such a manner that on outlet therefrom they present a selected spectral spacing.

11. A method according to claim 9, used in a field selected from a group comprising: interlacing or multiplexing modes; filtering modes; and changing modes in-line.

* * * * *